(12) United States Patent
Bertero et al.

(10) Patent No.: US 6,435,217 B1
(45) Date of Patent: Aug. 20, 2002

(54) MULTILAYER FUEL PIPE

(75) Inventors: Luciano Bertero, Rivalta; Donato Dimattia, Teramo, both of (IT)

(73) Assignee: Dayco Europe S.r.l., Colonnella (IT)

( * ) Notice: Subject to any disclaimer, the term of this patent is extended or adjusted under 35 U.S.C. 154(b) by 0 days.

(21) Appl. No.: 09/571,662

(22) Filed: May 15, 2000

(30) Foreign Application Priority Data

May 21, 1999 (IT) ......................................... TO99A0433

(51) Int. Cl.[7] ................................................. F16L 11/10
(52) U.S. Cl. ....................... 138/126; 138/137; 138/141; 428/36.91
(58) Field of Search ................................. 138/125, 126, 138/137, 141; 428/36.91

(56) References Cited

U.S. PATENT DOCUMENTS

| | | | | |
|---|---|---|---|---|
| 4,905,735 A | * | 3/1990 | Akiyoshi | 138/126 |
| 4,907,625 A | * | 3/1990 | Ito et al. | 138/126 |
| 4,998,564 A | * | 3/1991 | Igarashi et al. | 138/125 |
| 4,998,565 A | * | 3/1991 | Kokuryu et al. | 138/126 |
| 5,093,166 A | * | 3/1992 | Nishimura | 138/126 |
| 5,380,571 A | * | 1/1995 | Ozawa et al. | 138/124 |
| 5,957,164 A | | 9/1999 | Campbell | |
| 6,237,641 B1 | * | 5/2001 | Niki et al. | 138/126 |

FOREIGN PATENT DOCUMENTS

| | | |
|---|---|---|
| DE | 4001125 | 12/1990 |
| DE | 4414955 | 9/1995 |
| DE | 19633133 | 3/1998 |

* cited by examiner

*Primary Examiner*—James Hook
(74) *Attorney, Agent, or Firm*—Stevens, Davis, Miller, Mosher, LLP

(57) ABSTRACT

A multilayer pipe for conducting fuel, in particular from a vehicle pump to the engine, and which is capable of withstanding pressures of over 100 bar, is impermeable to hydrocarbon vapors, and includes at least one inner layer of elastomeric material, preferably acrylonitrile/butadiene and hydrogenated acrylonitrile/butadiene; a barrier layer having at least one polyamide, preferably nylon 6/6.6 or mixtures of nylon and polypropylene; a reinforcing layer defined by a spun fabric having aramidic fibers, preferably TWARON® or KEVLAR®; and a cover layer of elastomeric material, preferably chlorinated polyethylene.

18 Claims, 1 Drawing Sheet

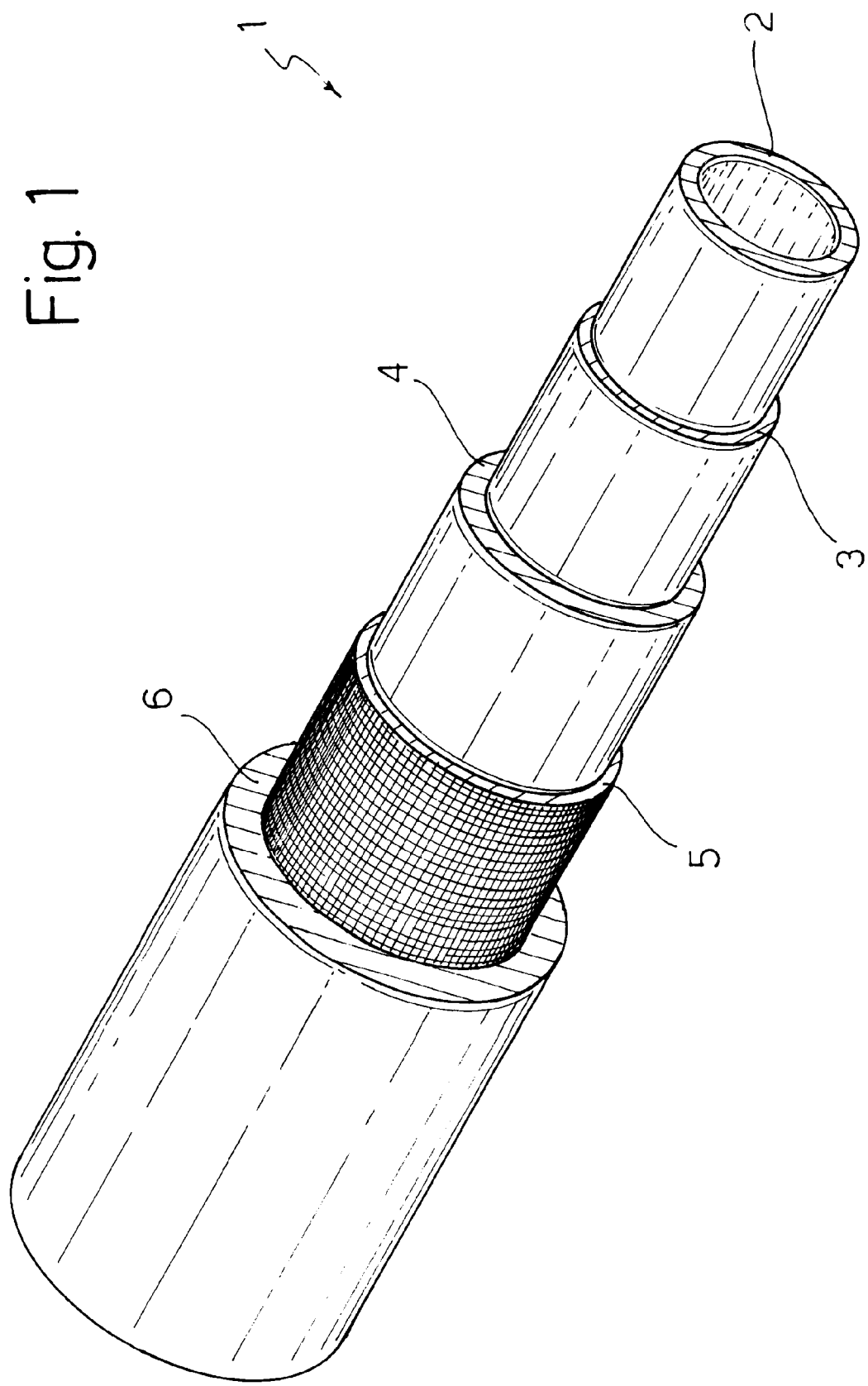

MULTILAYER FUEL PIPE

The present invention relates to a multilayer pipe made of elastomeric material, and in particular for feeding high-pressure fuel from a pump to a vehicle engine.

BACKGROUND OF THE INVENTION

As is known, vehicle fuel feed pipes are made of thermoplastic or elastomeric material, and preferably comprise a number of layers of materials of different chemical compositions. For safety reasons, a multilayer petrol pipe must be impermeable to petrol vapor, resistant to both high and low temperatures, and flame-resistant.

Pipes made of elastomeric material normally comprise an inner layer, a reinforcing layer of plastic fibres, and a cover layer of elastomeric material.

Such pipes are used widely on account of the inner layer of elastomeric material, which simplifies connection by not requiring the special seals required by corresponding pipes of thermoplastic material, and on account of the excellent high-temperature and flame resistance of the outer layer.

Such pipes also feature a barrier layer to prevent permeation by fuel vapor.

Pipes have been proposed in which the inner layer is made of fluorinated rubber, e.g. VITON®, and the barrier layer of TEFLON®. The mixtures forming the inner layer, however, pose problems in cold working conditions, while the pipes themselves are extremely expensive to produce.

Modern direct-injection systems also call for feeding high-pressure fuel, e.g. of over 100 bar. So far, this has been done using metal pipes capable of withstanding high pressure, while at the same time being impermeable to vapor. Being substantially rigid, however, metal pipes pose problems in terms of vibration resistance, provide for substantially no damping of pulsating pressure, are difficult to fit, and condition design of the engine compartment.

SUMMARY OF THE INVENTION

It is an object of the present invention to provide a pipe capable of substituting currently used low-pressure-resistant plastic pipes, but which may also be used at pressures of over 100 bar to also substitute metal pipes, and is therefore impermeable to petrol vapor, resistant to high and low temperatures, flame-resistant, and flexible.

According to the present invention, there is provided a multilayer pipe for conducting hydrocarbons, and comprising at least one inner layer of elastomeric material; a barrier layer; a reinforcing layer made of spun fabric comprising fibers; and a cover layer of elastomeric material; wherein said barrier layer comprises at least one polyamide.

In particular, according to a preferred embodiment of the present invention, there is provided a multilayer pipe including at least one inner layer comprising a material selected from the group consisting of acrylonitrile/butadiene, hydrogenated acrylonitrile/butadiene, chlorosulfonated polyethylene, and EPDM; a barrier layer comprising a material selected from the group comprising aliphatic or aromatic polyamides, polyamide mixtures, and polyamide-polyolefin mixtures; a reinforcing layer of spun fabric comprising fibers of a material selected from the group consisting of aliphatic polyamides, aromatic polyamides, and polyesters; and a cover layer comprising a material selected from the group consisting of chlorosulfonated polyethylene, chlorinated polyethylene, acrylonitrile/butadiene and PVC mixtures, epichlorohydrin, EPDM, chloroprene, EVA and EVM.

BRIEF DESCRIPTION OF THE DRAWING

The present invention will be described with reference to the accompanying drawing, which shows a partial section of a multilayer pipe 1 in accordance with the present invention.

DETAILED DESCRIPTION OF THE INVENTION

The pipe according to the present invention is produced using the known process for producing pipes of elastomeric material for conducting hydrocarbons, but using innovative materials and material combinations.

In particular, pipe 1 comprises at least one inner layer 2 of elastomeric material; a fuel vapor barrier layer 3; a second inner layer 4; a spun reinforcing fabric 5 to improve the mechanical strength of the pipe; and a cover layer 6. Pipe 1 is purely an example embodiment of the present invention, and may comprise additional layers; the second inner layer may be dispensed with; and the layer thicknesses may vary; all without departing from the scope of the invention.

In particular, for inner layer 2 of elastomeric material, the main component of the mixture is preferably a polymer selected from the group consisting of acrylonitrile/butadiene, hydrogenated acrylonitrile/butadiene, chlorosulfonated polyethylene, EPDM, and chlorinated polyethylene. Even more preferably, inner layer 2 is formed from mixtures of acrylonitrile/butadiene and hydrogenated acrylonitrile/butadiene, or from chlorosulfonated polyethylene.

Polymers of the ENICHEM EUROPRENE® family are used, for example, as acrylonitrile/butadiene, and polymers of the Nippon Zeon ZETPOL® family may be used, for example, as hydrogenated acrylonitrile/butadiene. Inner layer 2 may be formed using extrusion methods with which any technician in this particular field is familiar. The thickness of the inner layer may vary, depending on the polymer selected as the base material, and on average ranges between 1 and 2 mm, preferably between 1.2 and 1.8 mm, and, even more preferably, is about 1.4 mm. The inside diameter of pipe 1 may preferably range between 5 and 8 mm, more preferably between 6 and 7 mm, and even more preferably between 6.35 and 6.65 mm; while the outside diameter ranges between 12 and 16 mm, preferably between 14 and 15 mm, and even more preferably between 14.4 and 14.6 mm.

Inner layer 2 may contain conventional additives, such as reinforcing agents, fillers, pigments, stearic acid, accelerators, curing agents, antioxidants, activators, initiators, plasticizers, wax, precuring inhibitors, and similar. For example, carbon black, normally added in amounts ranging between 5 and 200 phr, may be used as a filler. Talc, calcium carbonate, silica and similar, in amounts normally ranging between 5 and 150 phr, or filler-containing oil dispersions may also be added. Organosilanes may be used in amounts ranging between 0.1 and 20 phr. As curing agents, those known to any technician in the field may be used, such as free sulfur or sulfur-donating curing agents, e.g. aminodisulfide and polymer polysulfides. The amount added varies according to the type of rubber and the curing agent used, and normally ranges between 0.1 and 10 phr. The antidegradants most commonly used in the mixture composition include microcrystalline waxes, paraffin waxes, monophenols, bisphenols, thiophenols, polyphenols, hydroquinone derivatives, phosphites, phosphite mixtures, thioesters, naphthylamines, diphenolamines, substituted and unsubstituted diarylamine derivatives, diarylphenylenediamines, paraphenylenediamines, quinolines, and amine mixtures. Antidegradants are normally used in amounts ranging between 0.1 and 10 phr. Representative of the process oils which may be used are dithiobisbenzanilide, polyparadinitrosobenzene, xylylmercaptans, polyethylene glycol, petroleum oils, cured vegetable oils, phenol-formaldehyde resins, synthetic oils, petroleum resins, and polymer esters. Process oils may be used in conventional amounts of 0 to 140 phr. As an initiator, stearic acid is used conventionally in amounts ranging between 1 and 4 phr. Conventional additives may also be used, such as calcium oxide, zinc oxide and magnesium oxide, normally in amounts ranging between 0.1 and 25 phr. Conventional accelerators or accelerator combinations are also used, such as amines, disulfides, guanidine, thiourea, thiazoles, mercaptans, sulfenamides, dithiocarbamates and xanthates, normally in amounts ranging between 0.1 and 100 phr.

A layer of thermoplastic material, in particular, a barrier layer 3 consisting of at least one polyamide, is extruded onto the inner layers of elastomeric material, and preferably comprises polyamides 6/6.6—i.e. mixtures of polyamide 6.6 and polyamide 6—also containing known additives such as plasticizers, e.g. polyamide mixtures marketed by ELF ATOCHEM as RILSAN® EM 067 HSP, or polyamide and polyolefin mixtures, such as those marketed by ELF ATOCHEM as ORGALLOY®, more preferably polyamide and polypropylene mixtures, e.g. ORGALLOY® RDG 113, polymers with physical-chemical characteristics closely resembling polyamide mixtures and in particular polyamides 6/6.6, and which are therefore also comparable to them when used for barrier layers. The thickness of the barrier layer depends on the type of polyamide used, but normally advantageously ranges between 0.1 and 0.3 mm, and preferably between 0.15 and 0.25 mm.

A FLUOZINC-type antiadhesive may then be added, and yarns of preferably synthetic fibers are then spun around inner layer 2 and barrier layer 3, and possibly around a second inner layer 4, to form spun reinforcing fabric 5 for improving the mechanical strength of the pipe. Mainly used are tightly woven, coiled or braided yarns with a polyester or aliphatic or aromatic polyamide fiber base. Preferably used are aramidic fibers, such as those marketed as KEVLAR® by Du Pont de Nemours, or fibres of TWARON®, an Akzo Nobel trademark.

A second inner layer 4 is optionally interposed between the barrier layer 3 and the spun reinforcing fabric 5, and comprises a polymer of the same or different chemical nature with respect to inner layer 2, and preferably selected from the group consisting of acrylonitrile/butadiene, hydrogenated acrylonitrile/butadiene, chlorosulfonated polyethylene, EPDM, and chlorinated polyethylene. The thickness of layer 4 obviously varies according to the polymer used, but normally ranges between 0.25 and 1.50 mm, and preferably between 0.45 and 0.65 mm.

The outer or cover layer 6 of elastomeric material is extruded directly onto the underlying structure, and advantageously comprises polymers selected from the group consisting of chlorosulfonated polyethylene, chlorinated polyethylene, acrylonitrile/butadiene and PVC mixtures, EPDM, chloroprene, EVA and EVM. The elastomers used are preferably chlorinated polyethylene or EPDM, and more preferably chlorinated polyethylene. The thickness of cover layer 6 obviously depends on the nature of the polymer used, and may range between 0.5 and 2.5 mm, preferably between 0.7 and 1.2 mm, and even more preferably between 0.85 and 1.05 mm.

Once all the layers are formed, pipe 1 is cured conventionally at temperatures ranging between 150° and 200° C. for preferably 1 to 2 hours.

A pipe 1 with the structure described above is capable of withstanding working pressures of over 100 bar, unlike currently used petrol pipes of elastomeric material, which have a working pressure resistance of about 10 bar, and a burst pressure of less than 100 bar.

More specifically, the structure of multilayer pipe 1 according to the present invention combines excellent pressure resistance and very low permeability to petrol vapor. As will be shown in the following examples, a pipe in accordance with the present invention has a burst pressure of over 400 bar, and may therefore be used in direct-injection systems requiring working pressures of over 100 bar.

Moreover, it is cheap to produce and flexible for easy assembly, thus enabling full freedom in the layout of engine compartment components.

Moreover, the pipe according to the invention requires no noble, intrinsically high-cost polymers, such as fluorinated polymers used in the known state of the art.

Clearly, changes may be made to the multilayer pipe as described and illustrated herein—in particular, to the percentage ratios of the chemical components of the various layers, to the relative thicknesses of the layers, and to the number of layers used—without, however, departing from the scope of the present invention. For example, a further inner layer and a further reinforcing layer of textile material may be provided.

The invention will now be described by way of a number of purely non-limiting examples.

EXAMPLE 1

A multilayer pipe in accordance with the present invention is produced by extruding—using known techniques and in known conditions—an inner layer from a mixture of 80 parts by weight of ENICHEM S.p.A. EUROPRENE® N 3345 acrylonitrile/butadiene, and 20 parts by weight of NIPPON ZEON Ltd ZETPOL® 2020L hydrogenated acrylonitrile/butadiene, to which conventional additives as referred to above have been added. A barrier layer of ELF ATOCHEM RILSAN® EM 067 HSP consisting of nylon 6/6.6 is then extruded onto the first layer by a second extruder; the pipe is then fed to a third extruder to add a second layer of elastomeric material consisting of PARACRIL® BJLT-M50 (by ENICHEM S.p.A.); and, finally, the pipe so formed is braided with aramidic fiber yarn on an OMA 24-spindle vertical braiding machine. More specifically, the primary yarns are made of AKZO NOBEL TWARON® 1680; three yarns are used for 24 spindles; the spindle tension is fixed at 1.1 kg, and the pitch at about 28.7 mm; and the final diameter of the resulting braid is 12.6 (±0.3) mm.

The pipe is then covered with a cover layer of chlorinated polyethylene (TYRIN® CM 0730 produced by DUPONT DOW ELASTOMERS) to give a final pipe diameter of 14.4 mm.

This is followed by a curing step at 157°±3° C. for about 75 minutes.

Table 1 shows the layer composition of a pipe in accordance with the present invention.

TABLE 1

| Layer | Chemical composition | Trade name | Supplier | Layer thickness |
|---|---|---|---|---|
| Inner layer | NBR/HNBR mixture | EUROPRENE ® | ENICHEM/ NIPPON ZEON | 1.4 mm |
| Inner layer | nylon 6/6.6 | RILSAN ® EM 067 HSP | ELF ATOCHEM | 0.2 mm |
| Second layer | NBR | PARACRIL ® BJLT-M50 | ENICHEM | 0.55 mm |
| Reinforcing layer | Aramidic fiber yarn | TWARON ® | AKZO NOBEL | / |
| Cover layer | CPE- chlorinated polyethylene | TYRIN ® CM 0730 | DUPONT DOW | 0.95 mm |

Comparison Example 2

By way of comparison, Table 2 shows the composition of a known elastomeric petrol pipe with an inner layer made of VITON®, a fluoroelastomer consisting of a terpolymer of vinyl fluoride, hexafluoropropylene and tetrafluoroethylene. This type of pipe is typical of the known state of the art, by being used for conducting hydrocarbons, and being impermeable to vapor and resistant to low pressure.

TABLE 2

| Layer | Chemical composition | Trade name | Supplier | Layer thickness |
|---|---|---|---|---|
| First inner layer | Fluoro- elastomer Terpolymer of vinyl fluoride | FKM VITON ® | DUPONT DOW ELASTOMERS | 0.63 mm |
| Second inner layer | Chlorinated polyethylene | HYDRIN ® C 65 | NIPPON ZEON | 2.3 mm |
| Reinforc- ing layer | Aramidic fiber yarn | KEVLAR ® | DUPONT DOW ELASTOMERS | / |
| Outer layer | Chlorinated polyethylene | HYDRIN ® C 65 | NIPPON ZEON | 2.6 mm |

EXAMPLE 3

Table 3 shows the chemical-physical characteristics of polymers used in the barrier layer of a pipe in accordance with the present invention.

TABLE 3

| Property | ASTM measuring method | Unit | RILSAN EM 067 HSP | ORGALLOY RDG 113 |
|---|---|---|---|---|
| Melting point, DSC | D3418 | ° C. | 221 | 229 |
| Breaking strength | D638 | KN/m$^2$ | 62052 | 72394 |
| Extensibility | D638 | % | 330 | 290 |
| Flexural modulus, Tangent | D790 | KN/m$^2$ | 413854 | 2482112 |

EXAMPLE 4

Permeation was measured using the SAE J1737 method, whereby the pipe, fed with a constant stream of petrol, is placed inside a sealed vessel into which dry nitrogen is fed; the dry nitrogen captures and transfers the vapors into a vessel full of active carbon, which adsorbs and retains the petrol vapors. The vessel is weighed periodically; the detected increase in weight is caused by the vapors permeating and adsorbed by the carbon; so permeation corresponds to the increase in weight of the active carbon, referred to a linear meter of pipe and over a period of 24 hours. The test conditions are shown in Table 4.

TABLE 4

| | |
|---|---|
| Petrol pressure | 4 bar |
| Petrol temperature | 60° C. |
| Petrol flow rate | 2 l/min |
| Vessel temperature | 60° C. |
| Carrier gas flow rate | 1.5 l/min |

Table 5 shows the respective permeation values of the pipe according to the present invention (indicated 1) with the composition described in Example 1; the comparison pipe (indicated 2) with the composition described in Example 2; and a single-layer pipe of polyamide 12 (indicated 3).

TABLE 5

| Pipe | 1 | 2 | 3 |
|---|---|---|---|
| Permeation in g/(m*24 h) | 0.014 | 0.73 | 0.88 |

The permeation value of the pipe according to the present invention is therefore about ⅙ that of the comparison pipes.

EXAMPLE 5

Different samples (at least three) of a multilayer pipe produced with the Example 1 composition were tested for resistance and high-pressure operation. The results are shown in Table 6, which shows the mean values of the different samples, and also the ozone resistance and low-temperature flexibility values.

TABLE 6

| Test | Results |
|---|---|
| Burst pressure | 731 |
| Volume expansion at 100 bar cc/m | 5 cc/m |
| 100 bar % change in length | −2.2% |
| Inside diameter (mm) | 7.7 mm |
| Outside diameter (mm) | 14.5 mm |
| Concentricity | 0.14 mm |
| Ozone resistance 50 pphm for 72 hours at 38° C. | no break |
| Low-temperature flexibility 24 hours at −40° C. | no break |

What is claimed is:

1. A multilayer pipe (1) for conducting hydrocarbons, said multilayer pipe (1) comprising:
    at least one inner layer (2) of elastomeric material;
    a barrier layer (3);
    a reinforcing spun fabric (5) comprising fibers; and
    a cover layer (6) of elastomeric material;
    wherein said pipe has a permeation value of less than 0.050 g/(m*24 h) when permeation tested as per SAE standard J1737; and said pipe is capable of withstanding a pressure of over 100 bar; and wherein said barrier layer comprises at least an aliphatic polyamide and said fibers comprise at least an aromatic polyamide.
2. A multilayer pipe as claimed in claim 1, wherein said cover layer (6) comprises at least one material selected from the group consisting of chlorosulfonated polyethylene, chlorinated polyethylene, acrylonitrile/butadiene, PVC mixtures, EPDM chloroprene, EVA and EVM.

3. A multilayer pipe as claimed in claim 1, wherein said barrier layer (3) comprises a mixture of polyamide 6 and polyamide 6/6.

4. A multilayer pipe as claimed in claim 1, wherein said barrier layer (3) comprises a mixture of polyamide and polyolefins.

5. A multilayer pipe as claimed in claim 4, wherein said polyolefins are polypropylene.

6. A multilayer pipe as claimed in claim 1, wherein said inner layer (2) comprises at least one material selected from the group consisting of acrylonitrile/butadiene, hydrogenated acrylonitrile/butadiene, chlorosulfonated polyethylene, EPDM and chlorinated polyethylene.

7. A multilayer pipe as claimed in claim 1, wherein said inner layer (2) comprises acrylonitrile/butadiene.

8. A multilayer pipe as claimed in claim 7, wherein said inner layer (2) further comprises hydrogenated acrylonitrile/butadiene.

9. A multilayer pipe as claimed in claim 1, wherein said pipe further comprises a second inner layer (4) interposed between said barrier layer (3) and said cover layer (6).

10. A multilayer pipe as claimed in claim 9, wherein said second inner layer (4) comprises a material selected in the group consisting of acrylonitrile/butadiene, hydrogenated acrylonitrile/butadiene, chlorosulfonated polyethylene, EPDM and chlorinated polyethylene.

11. A multilayer pipe as claimed in claim 9, wherein said second inner layer (4) comprises acrylonitrile/butadiene.

12. A multilayer pipe as claimed in claim 1, wherein said cover layer (6) comprises chlorinated polyethylene.

13. A multilayer pipe as claimed in claim 1, wherein said inner layer (2) is of a thickness ranging between 1 and 2 mm; said barrier layer (3) is of a thickness ranging between 0.1 and 0.3 mm, and said cover layer (6) is of a thickness ranging between 0.50 and 2.50 mm.

14. A multilayer pipe as claimed in claim 13, wherein said inner layer (2) is of a thickness ranging between 1.2 and 1.8 mm; said barrier layer (3) is of a thickness ranging between 0.15 and 0.25 mm; and said cover layer (6) is of a thickness ranging between 0.85 and 1.05 mm.

15. A method for using a multilayer pipe comprising:
    conducting hydrocarbons through said multilayer pipe, said multilayer pipe comprising at least one inner layer (2) of elastomeric material, a barrier layer (3), a reinforcing spun fabric (5) comprising fibers, and a cover layer (6) of elastomeric material, wherein said pipe has a permeation value of less than 0.050 g/(m*24 h) when permeation tested as per SAE standard J1737; and said pipe is capable of withstanding a pressure of over 100 bar, and wherein said barrier layer comprises aliphatic polyamide and said fibers comprise aromatic polyamide.

16. The method of claim 15, wherein said barrier layer consists essentially of said aliphatic polyamide and said fibers consist essentially of said aromatic polyamide.

17. The methods of claim 15, wherein the hydrocarbons comprise fuel.

18. The method of claim 17, wherein the conducting of the hydrocarbons is from a vehicle fuel pump to an engine compartment of the vehicle.

* * * * *